United States Patent Office 3,197,321
Patented July 27, 1965

3,197,321
SPRAY COMPOSITION
Lloyd T. Flanner, Glen Rock, N.J., assignor to Allied Chemical Corporation, New York, N.Y., a corporation of New York
No Drawing. Filed Aug. 29, 1962, Ser. No. 220,159
3 Claims. (Cl. 106—287)

This invention relates to a spray composition containing a biphenylyl phenyl silane, and adapted to be packaged in a conventional aerosol dispenser.

A number of biphenylyl silanes are known and have been recognized as useful where high temperature stability is required, e.g., for the lubrication or other surface treatment of hot metal. Among these biphenylyl silanes, those containing only biphenylyl groups and permissibly phenyl groups are of particular interest for their thermal stability, low vapor pressures and lubricating and surface protective properties. However these materials have rather low solubility in the usual solvents and their solution generally show poor compatibility with low boiling liquid propellants as used in spray compositions such as the chlorofluorinated hydrocarbons.

I have discovered a specific combination of solvent together with chlorofluorinated methane propellants which affords a satisfactory concentration of biphenylyl phenyl silane in a homogeneous spray composition and provides desirable spray characteristics which can be varied over a considerable range as may be required. My spray composition consists essentially of about 1–10 parts by wieght of at least one biphenylyl phenyl silane dissolved in about 10–50 parts by weight of tetrahydrofuran, and in quantities from about one-third the weight to about ten-fold the weight of the tetrahydrofuran solution, a mixture of propellant liquids consisting essentially of dichlorofluoromethane and chlorodifluoromethane in weight proportions of about 1:3–9:1 of said dichlorofluoromethane:said chlorodifluoromethane. For convenience the dichlorofluoromethane will be designated below as "21" and the chlorodifluoromethane as "22" in accordance with the convention in the refrigerating and aerosoling art.

As indicated above, the problems to be met in preparing a satisfactory spray compositon for packaging in an aerosol dispenser include satisfactorily high concentration of the active ingredient in any relatively high boiling solvent; adequate compatibility to afford a homogenous solution of active ingredient in solvent together with the low boiling liquid propellants used; sufficient pressure to throw the spray to the desired location; production of the required type of spray, i.e., wet (relatively coarse) or dry (relatively fine); and production of the required spray pattern, i.e., solid volume in which the spray particles lie. These problems are met in my compositions as will appear from the more detailed discussion which follows.

In my compositions I utilize a specific solvent, namely, tetrahydrofuran. This solvent is selected for my purpose because of its relatively good solvent power for the biphenylyl silanes and its satisfactory properties as to inertness toward metals and the like which it may contact in use, lack of toxicity and lack of explosiveness. A part of the tetrahydrofuran can be replaced in my compositions with other solvents for biphenylyl silanes, especially when th biphenylyl silane has relatively good solubility, as do the 3-biphenylyl silanes and trisbiphenylyl phenyl silanes; but the tetrahydrofuran will generally be at least the major ingredient of the solvent. The tetrakis biphenylyl and the various biphenylyl phenyl silanes to which my invention applies vary considerably in their degree of solubility in tetrahydrofuran but broadly their solubility lies within the range of 1–10 parts by weight of biphenylyl silane per 10 parts by weight of tetrahydrofuran. Thus my compositions will contain about 1–10 parts by weight of the silane ingredient and at least 10 parts by weight of tetrahydrofuran, and up to about 50 parts by weight of tetrahydrofuran when a relatively insoluble biphenylyl phenyl silane is to be employed. The 4-biphenylyl silanes tend to be less soluble than the 2- and 3-isomers; my invention is particularly applicable to the 4-isomers.

In my compositions the pressure is supplied largely by the 22 ingredient, which at room temperature develops a vapor pressure of about 13-fold the vapor pressure due to the 21 ingredient. The vapor pressure of tetrahydrofuran at room temperature is practically negligible in comparison. The proportion of the 22 ingredient will be chosen with reference to the whole spray composition to provide the necessary pressure and to provide together with the 21 ingredient the desired vapor:liquid volume ratio or expansion ratio of the composition. This expansion ratio controls the type of spray (wet or dry) and the spray pattern, a large ratio such as 150 and up to the limit permitted by the allowable pressure in the can, say, 250, giving a dry or fine spray with increasingly wide pattern and a small ratio such as about 80 and down giving a wet spray with progressively narrower pattern. Expansion ratio as low as 5 can be used to give practically a stream of liquid.

The 22 ingredient of my compositions is useful to provide the desired pressure but does not, alone, provide sufficient compatibility between the tetrahydrofuran solution of biphenylyl silane and the liquid propellant. I have found that the necessary compatibility is conferred, while necessary pressures and expansion ratios are maintained, by use of the 21 ingredient of my composition in weight proportions of at least about 1:3 with the 22 ingredient and up to about 9:1 of 21 ingredient:22 ingredient. The mixed propellants will be proportioned with each other and with the tetrahydrofuran solution within the above mentioned ranges to afford the desired level of pressure and the desired spray pattern in the final composition. In general the proportion of mixed propellants in the total spray composition will be at least about one-third the weight of tetrahydrofuran solution and up to about ten-fold the weight of the tetrahydrofuran solution. A composition of particular interest is based on crude tris(4-biphenylyl)phenyl silane having melting temperatures in the range between about 120° C. and about 250° C., dissolved in tetrahydrofuran at about 10–15% by weight concentration and formulated into a homogenous spray composition using about 2–10-fold the weight of the solution of about 1:1–9:1 by weight mixture of 21 propellant:22 propellant.

The following example sets forth a specific embodiment illustrative of the best mode of carrying out my invention contemplated by me, but it is to be understood that the invention is not limited by all details of the example.

Example

A crude tris(4-biphenylyl)phenyl silane was put up in spray form. This crude silane was in a form melting over the range of about 158° C.–172° C., the wide melting range being probably due both to presence of impurities such as tetrakis(4-biphenylyl)silane and to presence of two crystal forms of the tris(4-biphenylyl)phenyl silane. This silane compound was dissolved in tetrahydrofuran at weight percent concentration of 20%. To 20 parts of the resulting solution, an additional 10 parts of tetrahydrofuran was added and the solution thus obtained was packaged in a tin-lined aerosol dispenser, having a conventional upright button with one orifice of about 0.016 inch diameter, using the conventional cold filling technique together with 70 parts of a mixture of propellants 21 and 22 mixed in weight proportions of 3:1. This mixture of propellants 21 and 22 was found to have vapor pressure at 70° F. of 45 p.s.i.g. and the propellants had calculated expansion ratio (vapor volume:liquid volume) of 75. The spray composition was a clear homogeneous solution. It can be packaged equally well by the pressure filling technique.

The packaged spray composition was used for spraying A.I.S.I. Type 403 stainless steel spinnerets through which nylon 6 was being melt spun at a temperature of about 260°–265° C. The composition laid down a layer of the crude tris(4-biphenylyl)phenyl silane solution in tetrahydrofuran on the surface of the hot spinnerets 8 ft. above the point of spraying, which layer was highly effective to prolong the period of spinning between cleanings of the spinnerets.

I claim:

1. A spray composition consisting essentially of about 1–10 parts by weight of at least one biphenylyl silane in which all four of the groups which, together with one silicon atom, compose said silane are members of the class consisting of biphenylyl and phenyl, said silane being dissolved in about 10–50 parts by weight of tetrahydrofuran; and in quantities in the range from about one-third the weight to about ten-fold the weight of the tetrahydrofuran solution, a mixture of propellant liquids consisting essentially of dichlorofluoromethane and chlorodifluoromethane mixed in weight proportions of about 1:3–9:1.

2. Composition of claim 1 wherein the biphenylyl groups are 4-biphenylyl.

3. Composition of claim 1 wherein the silane compound consists essentially of a crude tris(4-biphenylyl)phenyl silane melting at temperatures in the range between about 120° C. and about 250° C.; wherein the concentration of tris(4-biphenylyl)phenyl silane in tetrahydrofuran is about 10–15% by weight; wherein the propellant liquids amount to about 2–10-fold the weight of the tetrahydrofuran solution, and wherein the proportions of dichlorofluoromethane:chlorodifluoromethane in the mixed propellant liquids are within the range between about 1:1 and about 9:1.

References Cited by the Examiner
UNITED STATES PATENTS 2,129,281  9/38  Lincoln et al. _____ 260—448.2
2,901,460  8/59  Boldebuck _____ 260—448.2
2,914,548  11/59 Schroll _____ 252—49.6

OTHER REFERENCES

Freon Compounds, Du Pont Technical Bulletin (1957).

MORRIS LIEBMAN, *Primary Examiner.*